United States Patent [19]

Shepard

[11] Patent Number: 4,998,439
[45] Date of Patent: Mar. 12, 1991

[54] ACOUSTIC WAVE GUIDE

[75] Inventor: Michael L. Shepard, Covington, Va.

[73] Assignee: Westvaco Corporation, New York, N.Y.

[21] Appl. No.: 461,740

[22] Filed: Jan. 8, 1990

[51] Int. Cl.$^5$ .................... G01N 29/14; G01N 29/28; F22B 37/42

[52] U.S. Cl. .................... 73/592; 73/40.5 A; 73/587; 73/644

[58] Field of Search .................... 73/40.5 A, 587, 590, 73/592, 644

[56] References Cited

U.S. PATENT DOCUMENTS

| | | | |
|---|---|---|---|
| 3,831,561 | 8/1974 | Yamamoto et al. | 340/605 |
| 4,498,333 | 2/1985 | Parthasarathy | 73/40.5 |
| 4,502,322 | 3/1985 | Tero | 73/40.5 |
| 4,822,428 | 4/1989 | Goodspeed | 15/246 |
| 4,960,079 | 10/1990 | Marziale et al. | 73/40.5 |

Primary Examiner—Hezron E. Williams
Attorney, Agent, or Firm—W. A. Marcontell; R. L. Schmalz

[57] ABSTRACT

Acoustic leak detection systems for boilers use wave guide tubes to conduct sound waves through the boiler wall for an environmentally safe location of microphones or transducers. To protect such wave guides from soot plugging, the boiler wall penetrating end of a wave guide is reciprocationally mounted within a soot shield. Linear motors mounted between the wave guide and soot shield base stroke the wave guide axially within the shield to dislodge accumulated soot upon command signal. Compressed air released from within the wave guide, also upon command signal, ejects loose soot particles from interior wave guide surfaces.

3 Claims, 2 Drawing Sheets

ACOUSTIC WAVE GUIDE

BACKGROUND OF THE INVENTION

1. Field of the Invention

The present invention generally relates to steam boilers and more specifically, the apparatus for determining the existence of fluid leaks from pressurized tubing suspended within a boiler combustion space.

2. Description of the Prior Art

To detect the existence of steam leaks from boiler tubes suspended within a combustion space, acoustically sensitive systems have been developed to monitor combustion chamber sound emissions. Such systems are designed to measure the magnitude of sonic energy from the combustion chamber over a narrow frequency spectrum distinctive to fluid leaks from conduits.

Essential to such acoustic systems are one or more pressure transducers or microphones tuned to the frequency spectrum of greatest interest. In deference to the fact that transducer materials are heat sensitive, or, at least unable to withstand direct combustion chamber conditions, these transducers must be physically positioned in wave guides outside the combustion chamber walls.

Wave guides are tubular conduits of about 1½ to 2 inches diameter having polished internal bores. An open end of the conduit penetrates the combustion chamber wall to be aimed at a precise boiler tube section. The other or external end of the wave guide conduit, whereat the sonic pressure transducer is mounted, is closed to provide an insular dead air space between the transducer and the direct combustion environment. Frequently, the wave guide conduit is arced up to 90 degrees along the tubular axis.

Although the wave guide dead air space effectively insulates a sonic transducer from heat, the open bore of the wave guide tube at the combustion chamber end thereof is vulnerable to an accumulation of combustion products collectively characterized as "soot." If permitted, soot will deposit within the wave guide bore until complete plugging occurs. Any substantial accumulation will reduce the sonic transmission efficiency of the guide. Keeping such wave guide bores clear of soot is therefore a substantial maintenance burden: especially in the case of chemical recovery boilers which generate soot at rates several times greater than traditional fuel fired boilers.

In the past, soot clearing maintenance has been served by an external rodding port axially aligned with the wave guide bore opening. Although such ports provide convenient manual accessibility to the critical soot accumulation areas, the task remains as basically manual function. For an acoustic leak detection system utilizing 12 or more transducers and wave guides as primary data sources, such manual maintenance represents a substantial labor burden.

It is, therefore, an object of the present invention to provide an acoustic detection unit for boilers having minimum manual maintenance requirements.

Another object of the invention is to provide an automatic soot clearing system for acoustic detection wave guides.

SUMMARY

These and other objects of the invention to be set forth more fully hereafter are derived from a telescope bracket respective to each wave guide secured to a corresponding boiler wall. A cylindrical shield portion of the bracket penetrates the boiler wall and projects in both directions beyond the wall plane. The interior or combustion chamber end of the shield is cut along a plane angled to the cylinder axis to provide an end protective bezel. The exterior end of the shield is flanged as a motor mount.

From the interior end of the wave guide at an appropriate distance, a motor mount flange is secured around the wave guide tube. A linear motor secured between the two mounts reciprocates the wave guide interior end axially within the shield.

A short sub conduit coaxial with the wave guide interior end projects a tangent from the wave guide arc. This sub conduit is terminated with a tee having the leg thereof oriented to project laterally to the sub axis. The axially open end of the tee is normally plugged.

Connected to the tee leg is a selectively controlled pressurized air source to blow loose soot from the shield interior after fracture by a stroke of the wave guide tube therewithin.

BRIEF DESCRIPTION OF THE DRAWING

Relative to the drawing wherein like reference characters designate like or similar elements throughout the several figures of the drawing.

DESCRIPTION OF THE PREFERRED EMBODIMENT

Figure 1:
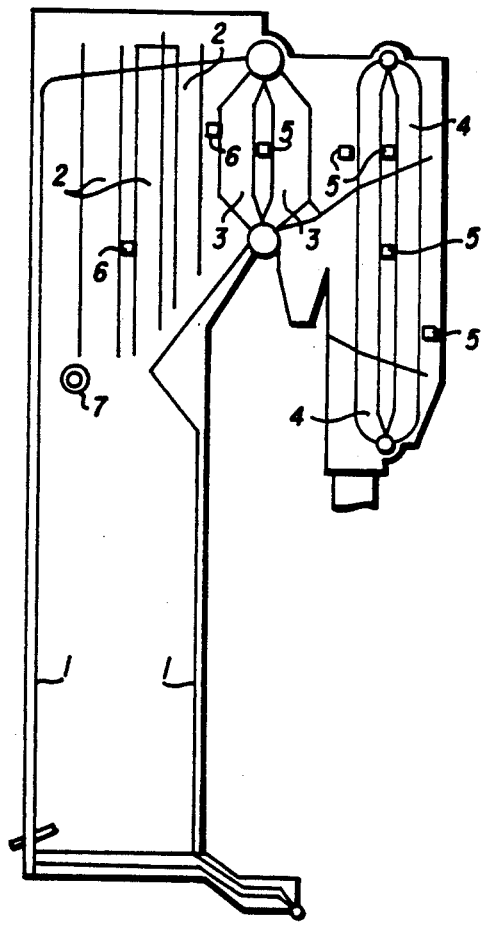
FIG. 1 is a schematic elevation of a large steam boiler.

Relative to the schematic of FIG. 1, reference character 1 designates a steam boiler tube, 2 is a superheater section, 3 are boiler tubes, 4 an economizer section, 5 are manholes, 6 are peep holes and 7 is an acoustic wave guide unit.

Figure 3:
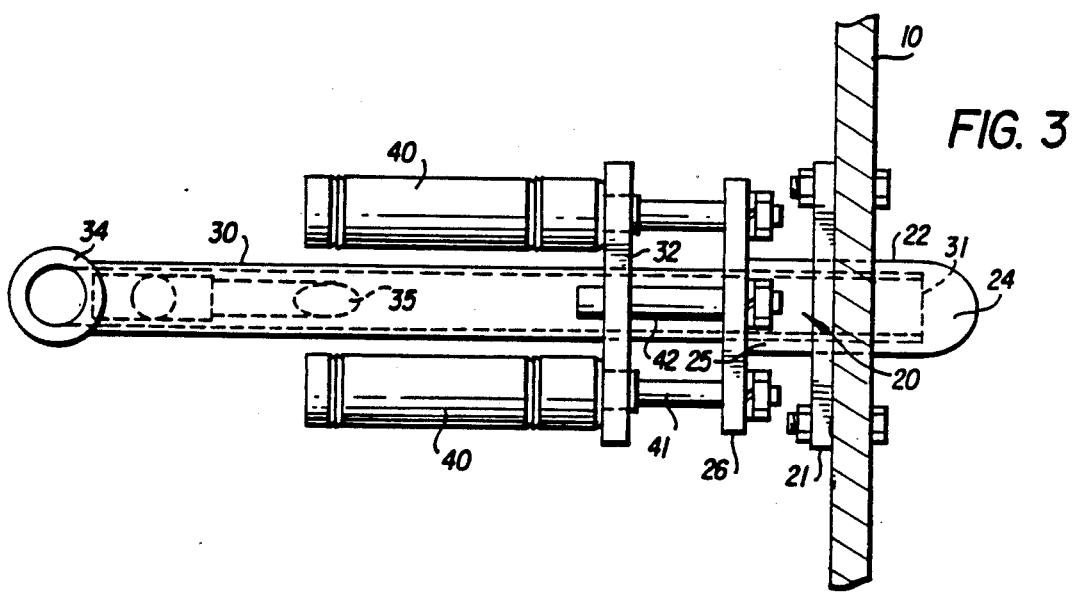
FIG. 3 is a plan view of the present invention.
Figure 2:
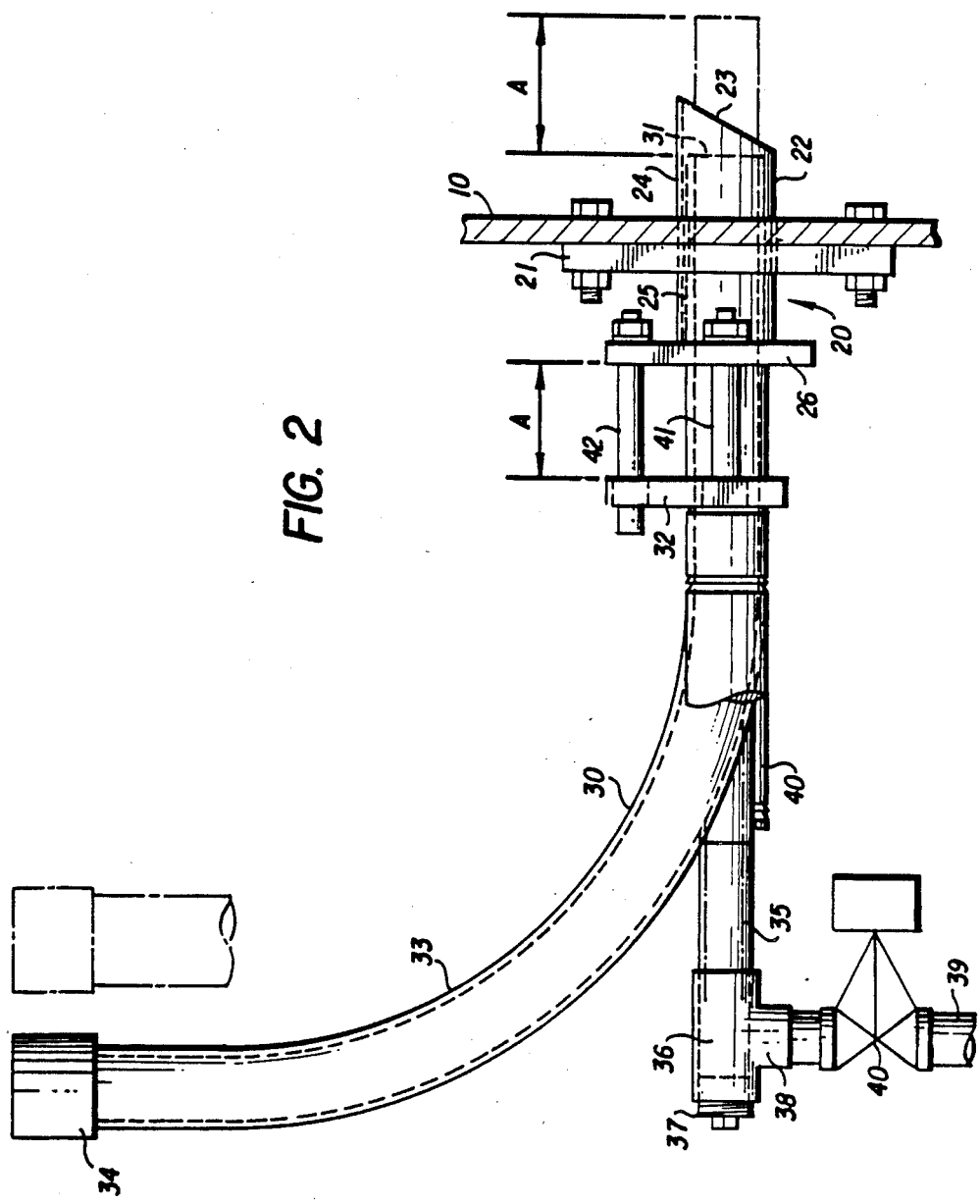
FIG. 2 is an elevational view of the present invention.

The wave guide unit of the present invention is illustrated by FIGS. 2 and 3 and includes a telescope bracket 20 secured directly to the boiler wall 10 or inspection door by a mounting plate 21. Passing through apertures in the boiler wall 10 and mounting plate 21 is a cylindrical soot shield 22 having a beveled end 23. The soot shield 22 is welded or otherwise rigidly secured to the mounting plate 21 along the midsection thereof to divide the shield length into internally and externally projecting portions thereof, 24 and 25, respectively. At the distal end of the externally projecting portion 24 is a rod flange 26.

The inside diameter of the soot shield 22 is sized to slidably receive the reception end 31 of an arced wave guide tube 30. A cylinder mounting flange 32 is secured to the wave guide tube 30 along a straight portion of length between the reception end 31 and an arced portion 33. At the opposite end of the arc is an acoustic transducer mount 34.

Along an axial extension of the wave guide tube reception end under the arc 33 is a sub conduit 35 terminated by a tee joint 36. The guide tube end of the sub conduit 35 penetrates the guide tube wall without an internal bore projection.

Normally, the run end of the tee 36 is closed by a removable plug 37. The tee leg 38 connects a source of pressurized air 39 with the internal bore of sub conduit 35. Air flow from the pressure source is controlled by a solenoid or motor valve 40.

Rod and cylinder flanges 26 and 32, respectively are connected by means of a linear motor link such as rods 41 actuated by fluid motors 40 having a stroke length A. One or more guide rods 42 may be used to secure and maintain linear alignment between the guide tube and shield 22.

Operatively, the normally functioning position of the wave guide tube 30 is where the reception end 31 is retracted within the enclosure of shield 22 and the rods 41 of fluid motors 40 are extended. Most soot accumulations are deposited on the internal rim of the shield 22.

Periodically, the fluid motors 40 are actuated to retract the wave guide and 31 from the beveled end 23 of shield 22. Due to the brittle and fragile nature of the soot deposits, most are cleared from the shield rim by such physical displacement. Simultaneously, however, air valve 40 is operated to further purge the opening.

Over long periods of operating time, it is possible that some soot will accumulate within the wave guide reception end 31 notwithstanding periodic stroking by the motors 40. For this purpose, tee plug 37 is removed to permit manual rodding of the wave guide bore per se.

Having fully disclosed my invention, obvious alternatives and mechanical equivalents will readily occur to those of ordinary skill in the art. Therefore,

I claim:

1. An acoustic wave guide unit for receiving sonic emissions from a boiler combustion chamber, said unit comprising a wave guide tube and a boiler wall mounting bracket, said bracket comprising a cylindrical tube shield having a projection length extending into said combustion chamber through a boiler wall aperture and mounting means for securing said bracket to said boiler wall, an open bore within said tube shield for slidably and coaxially receiving therewithin a reception end of a wave guide tube, means for mounting a sonic transducer at an opposite end of said wave guide tube, and, linear motor means secured between said mounting bracket and said wave guide tube to selectively displace said wave guide reception end coaxially within said tube shield.

2. An acoustic wave guide unit as described by claim 1 wherein said wave guide tube includes an arced section between said transducer mounting means and an axially straight, reception end section, said straight section being axially projected beyond a point of tangency with said arced section by a sub conduit having an internal tubular bore in open communication with an internal bore of said wave guide tube, said sub conduit internal bore being coaxially plugged at an end opposite from said wave guide tube tangency by selectively removable obstruction means.

3. An acoustic wave guide unit as described by claim 2 wherein said sub conduit also includes a laterally connected source of selectively opened pressurized air.

* * * * *